United States Patent
Rugo et al.

(10) Patent No.: US 7,996,587 B2
(45) Date of Patent: Aug. 9, 2011

(54) MODULE WITH ISOLATED ANALOGUE INPUTS HAVING LOW LEAKAGE CURRENT

(75) Inventors: Serge Rugo, La Roquette sur Siagne (FR); Richard Tonet, Le Rouret (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 316 days.

(21) Appl. No.: 12/126,480

(22) Filed: May 23, 2008

(65) Prior Publication Data

US 2008/0320182 A1 Dec. 25, 2008

(30) Foreign Application Priority Data

Jun. 19, 2007 (FR) ...................... 07 55830

(51) Int. Cl.
*G06F 3/00* (2006.01)
*G06F 5/00* (2006.01)
(52) U.S. Cl. ............................. 710/51; 710/8
(58) Field of Classification Search .................. 710/8, 51
See application file for complete search history.

(56) References Cited

U.S. PATENT DOCUMENTS

| 4,821,167 | A | | 4/1989 | Wiebe | |
|---|---|---|---|---|---|
| 5,083,288 | A | * | 1/1992 | Somlyody et al. | 702/116 |
| 5,323,014 | A | * | 6/1994 | Liscio et al. | 250/551 |
| 6,163,600 | A | * | 12/2000 | Miyake et al. | 379/100.15 |
| 6,376,851 | B1 | * | 4/2002 | Worley | 250/551 |
| 2003/0074214 | A1 | * | 4/2003 | Kelliher | 705/1 |
| 2008/0249385 | A1 | * | 10/2008 | Phan | 600/347 |
| 2008/0252257 | A1 | * | 10/2008 | Sufrin-Disler et al. | 320/118 |

FOREIGN PATENT DOCUMENTS

WO　　WO 01/88644 A2　　11/2001

* cited by examiner

*Primary Examiner* — Henry W Tsai
*Assistant Examiner* — Kris Rhu
(74) *Attorney, Agent, or Firm* — Oblon, Spivak, McClelland, Maier & Neustadt, L.L.P.

(57) ABSTRACT

A module with isolated analog inputs for a programmable controller, the module including plural input pathways that are each isolated with aid of at least one optical isolation static relay controlled selectively with the aid of a controller. The module further includes a multiplexer including plural channels each controlled to open or to close, a channel of the multiplexer being placed in series with an isolated input pathway of the module.

11 Claims, 1 Drawing Sheet

MODULE WITH ISOLATED ANALOGUE INPUTS HAVING LOW LEAKAGE CURRENT

FIELD OF THE INVENTION

The present invention pertains to a module with analogue inputs that is used in a programmable controller.

BACKGROUND

A programmable controller or PLC ("Programmable Logical Controller") is an automatic control facility capable of driving, controlling and/or monitoring one or more processes to be controlled.

Of generally modular design, a PLC programmable controller is composed of various modules which intercommunicate through a transmission bus, called a "backplane" bus in this field. The modules are fixed mechanically in a rack, which comprises a printed circuit which also supports the backplane bus as well as the connection elements intended to cooperate with connectors generally present on the rear part of the modules so as to effect the necessary link between the modules and the bus. The number of modules depends of course on the size and the type of process to be automated.

Typically, a programmable controller can comprise:
- A power supply module providing the various voltages to the other modules through the backplane bus.
- A central unit module UC which comprises embedded software ("firmware") integrating a real-time operating system OS, and an application program, or user program, containing the instructions to be executed by the embedded software to perform the desired control operations. The UC module also generally comprises a connection on the front face to programming tools of personal computer PC type.
- Input/output I/O modules of various types as a function of the process to be controlled, such as digital I/Os or analogue TORs for counting, etc. These I/O modules are linked to sensors and actuators participating in the automated management of the process.
- One or more modules for communicating with communication networks (Ethernet, CAN, etc.) or man-machine interfaces (screen, keyboard, etc.).

By way of example, an input/output module can comprise between 1 and 32 I/O pathways, a PLC controller that may be capable, depending on the model, of managing several hundred I/O pathways. If required, several racks are therefore connected together in one and the same PLC. Thus, as a function of the application and the process to be automated, a PLC controller can comprise a large number of modules.

Currently, analogue input modules comprise several pathways isolated from one another with the aid of optical isolation static relays also called "OptoMos" (trademark). Each pathway of the module is controlled by two static relays, one of the poles of whose MOSs is common. These components have an almost unlimited lifetime but each exhibit a not inconsiderable leakage current. Thus, when the module comprises more than four pathways, the unit leakage currents of each of the static relays add together thus giving rise to consequent errors in the measurements.

SUMMARY

The aim of the invention is to propose a module with analogue inputs comprising several pathways isolated from one another, in which the leakage currents are particularly reduced so as to always be able to guarantee the precision of the measurements.

This aim is achieved by a module with isolated analogue inputs for programmable controller, the said module comprising several input pathways that are each isolated from one another with the aid of at least one optical isolation static relay controlled selectively with the aid of control means, the said module being characterized in that it comprises a multiplexer furnished with several channels each controlled to open or to close, a channel of the multiplexer being placed in series with an isolated input pathway of the module.

According to one feature, each input pathway is isolated with the aid of two optical isolation static relays arranged in series.

According to another feature, the multiplexer is of low-voltage analogue type.

According to another feature, the multiplexer comprises control means intended to selectively control each of its channels.

According to another feature, the control means of the multiplexer are coupled to the control means of the optical isolation static relays.

According to another feature, the multiplexer comprises eight channels. It comprises at least as many channels as pathways in the module. If it comprises more channels than pathways in the module, some of its channels can be employed for the autocalibration of the measurement chain.

The module according to the invention is adapted to be employed in a modular programmable controller.

Other characteristics and advantages will appear in the detailed description which follows while referring to an embodiment given by way of example and represented by the appended drawings in which:

DESCRIPTION OF EXEMPLARY EMBODIMENTS

Figure 1:
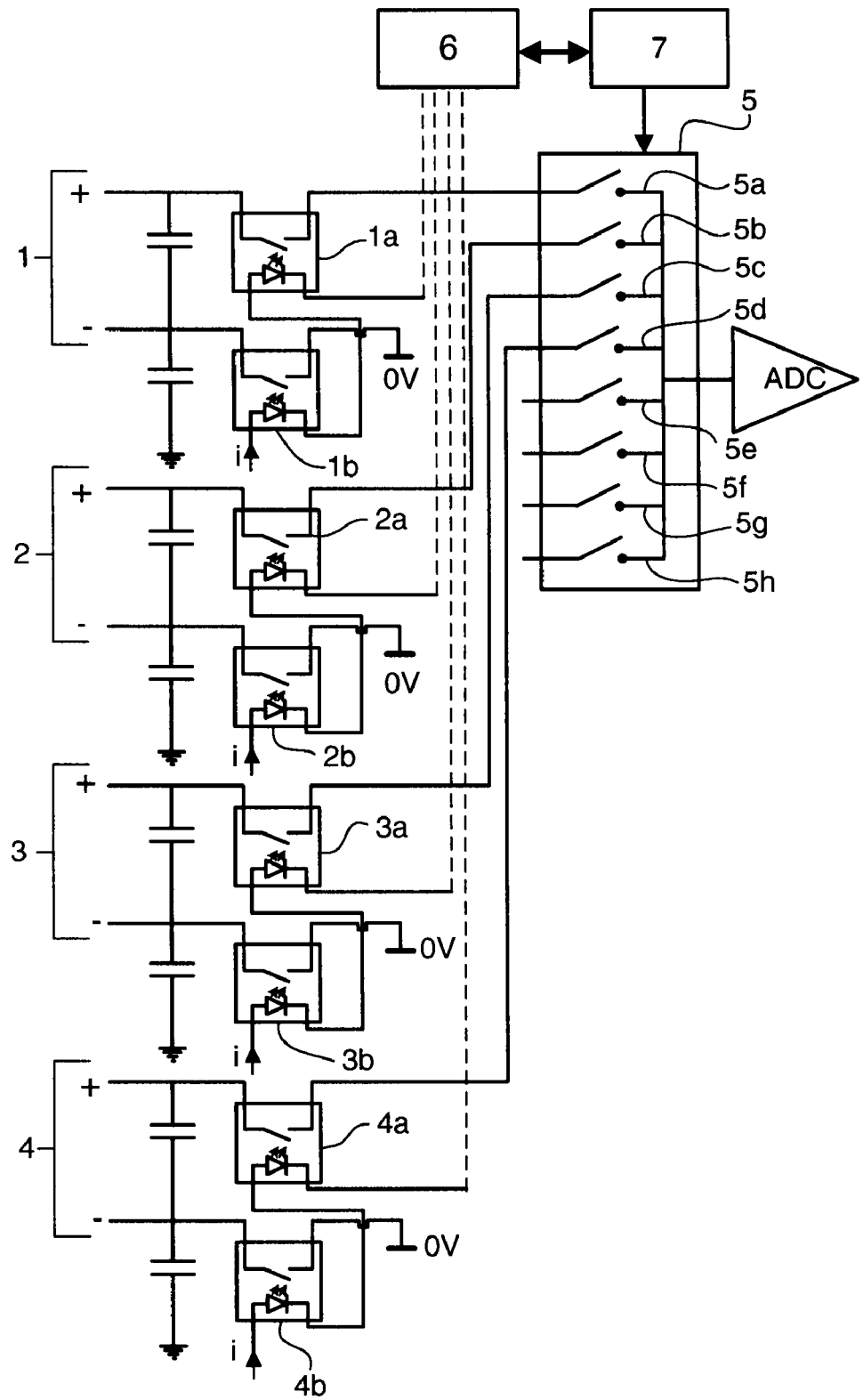
FIG. 1 schematically represents the structure of the invention.

A module with analogue inputs comprises several pathways 1, 2, 3, 4 isolated with the aid of optical isolation static relays, also called "OptoMos" (trademark). This type of component is in particular described in U.S. Pat. No. 4,390,790. More precisely, this type of optical isolation static relay 1a, 1b, 2a, 2b, 3a, 3b, 4a, 4b (hereinafter 1a-4b) comprises an input circuit composed of a light-emitting diode able to convert an input control signal (i in FIG. 1) into infrared light. The light-emitting diode is optically coupled to a conversion circuit formed of an assembly of photovoltaic cells and of associated drive circuits. The photovoltaic cell generates the voltage necessary for the control of a MOSFET circuit (represented in a simplified manner by a simple breaker) which switches the output load.

With reference to FIG. 1, in a module with isolated analogue inputs, each pathway comprises two optical isolation static relays (hereinafter static relay). For each input pathway, the two static relays are linked in series by their input circuit. The inputs of the MOSFET circuits are linked to a terminal block which defines hardware-wise the various pathways to which the sensors will connect. Control means 6 make it possible to selectively control each input pathway 1-4 by dispatching the control signal into the input circuits of the two static relays in series. The optical isolation static relays support voltages of possibly as much as 600 volts for switching times of less than 1 ms.

The optical isolation static relays 1a-4b make it possible to isolate the pathways from one another. For the unselected input pathways, these static relays each allow through a not inconsiderable leakage current. The addition of these leakage currents gives rise to errors in the measurements which may turn out to be crippling when the number of pathways is greater than four.

According to the invention, a low-voltage analogue multiplexer 5 (DC supply voltage lying between +30 VDC and −30 VDC approximately) is therefore placed between the analogue-digital converter ADC and the static relays 1a-4b. This multiplexer 5 exhibits a number of channels that is at least equal to the number of pathways of the input module. In FIG. 1, each channel 5a-5h of the multiplexer 5 is controlled by a distinct breaker connected on the one hand to the MOSFET circuit of the first optical isolation static relay 1a, 2a, 3a, 4a of a pathway 1-4 and on the other hand to the analogue-digital converter ADC. The output of the MOSFET circuit of the second static relay 1b, 2b, 3b, 4b of each pathway is for its part linked to the analogue zero volts. The breakers of the multiplexer 5 can for example exhibit a structure of MOSFET type and they make it possible to limit the leakage currents destined for the analogue-digital converter ADC to a few nanoamperes.

The multiplexer 5 comprises for example eight channels 5a-5h and control means 7 making it possible to selectively control each of the pathways. The multiplexer 5 is for example available under the reference ADG508F. The control means 7 of the multiplexer are for example coupled to the control means 6 of the static relays 1a-4b so as to synchronize the selective open/close control of each of the pathways 1-4 and the selective open/close control of the corresponding channel 5a-5h of the multiplexer 5.

When its number of channels is sufficient, the multiplexer 5 can carry out two functions. The first function already described above is to reduce the leakage currents of the static relays 1a-4b by connecting each input pathway to a channel 5a-5d of the multiplexer 5. The multiplexer can furthermore be involved in the autocalibration of the measurement chain. Specifically, so as to avoid procedures for periodic calibration so as to guarantee the precision of the measurements, it is known to embed an autocalibration function carried out by virtue of the microprocessor of the card of the input module. The autocalibration of the measurement chain is carried out with the aid of a reference circuit of precise voltage and the multiplexer. In this case, the multiplexer 5 makes it possible to route the voltage reference in order to measure it and to short-circuit the input of the bus in order to measure the offset voltage. These two measurements carried out cyclically make it possible to compensate for the acquisition chain measurement errors.

Thus, when, as represented in FIG. 1, the module comprises four input pathways 1-4 and the multiplexer comprises eight channels 5a-5h, four channels 5a-5d of the multiplexer 5 are placed in series with the optical isolation static relays so as to limit the leakage currents and the other four channels 5e-5h can be employed in the following manner:
  one channel routes the voltage reference,
  one channel routes the ground,
  one channel routes the power supply (5 volts) intended to detect a reference voltage fault,
  one channel is unused and is grounded.

It is of course understood that it is possible, without departing from the scope of the invention, to contemplate other variants and refinements of detail and even to envisage the use of equivalent means.

The invention claimed is:

1. A module with isolated analog inputs for use with a programmable controller, comprising:
  a plurality of input pathways that are each isolated by at least one respective of optical isolation static relays controlled selectively by a first controller, wherein each pathway passes a respective signal;
  a multiplexer including a plurality of channels including one respective channel for each of the plurality of input pathways, that each include a respective breaker controlled by a second controller to open or to close, wherein each respective channel of the multiplexer receives a respective signal passing on a respective of the pathways, and outputs a selected of the received signals, and the second controller controlling the multiplexer is coupled to the first controller controlling the optical isolation static relays so as to synchronize opening/closing of the plurality of input pathways, by controlling the respective plural isolation static relays, with opening/closing of a respective channel of the multiplexer, the multiplexer further including at least one channel employed to carry out an autocalibration including a channel routing a voltage reference, and the multiplexer further configured to short-circuit its input, for the autocalibration; and
  an analog-digital converter connected to an output of the multiplexer, wherein the analog-digital converter receives the selected signal output from the multiplexer.

2. A module according to claim 1, wherein each input pathway is isolated by two optical isolation static relays arranged in series.

3. A module according to claim 1, wherein the multiplexer is a low-voltage analog multiplexer.

4. A module according to claim 3, wherein the multiplexer is a low-voltage analog multiplexer with a supply voltage of approximately thirty volts.

5. A module according to claim 1, further comprising a second controller to selectively control each breaker of the multiplexer.

6. A module according to claim 5, wherein the second controller of the multiplexer is coupled to the first controller of the optical isolation static relays.

7. A module according to claim 1, wherein the multiplexer comprises eight channels.

8. A module according to claim 1, wherein the multiplexer comprises a channel routing ground.

9. A module according to claim 1, wherein the multiplexer comprises a channel routing a power supply voltage.

10. A module according to claim 1, wherein the multiplexer allows less leakage current than the optical isolation static relay.

11. A module according to claim 1, wherein the plurality of input pathways comprises greater than 4 input pathways.

* * * * *